Patented Apr. 20, 1926.

1,581,823

UNITED STATES PATENT OFFICE.

ROBERT MORSE WITHYCOMBE, OF SYDNEY, NEW SOUTH WALES, AUSTRALIA.

PROCESS OF UNITING RUBBER AND METAL.

No Drawing. Application filed November 3, 1924, Serial No. 747,686. Renewed September 25, 1925.

*To all whom it may concern:*

Be it known that I, ROBERT MORSE WITHYCOMBE, a subject of the King of Great Britain, residing at "Wyoming," Sydney, in the State of New South Wales, Commonwealth of Australia, have invented certain new and useful Improvements in Processes of Uniting Rubber and Metal, of which the following is a specification.

This invention relates to the process of uniting rubber and metal.

The uniting of rubber with metal by a bond which is more than mere frictional adhesion has long been sought by engineers and experimenters in those industries in which rubber linings for tanks or pipes, or rubber coating for metallic articles in general, could be advantageously employed.

Heretofore, the best results that have been obtained have been a coating or lining united to a metallic surface by mere adhesion and which could be readily peeled from said surface.

By the present invention I am able to produce a rubber coated metallic surface from which the rubber canont be chipped, torn, or peeled from the metal, preferentially in the original plane of separation between the metal and rubber, from which it would therefore appear that the rubber makes at least an inter-molecular union, and more probably a chemical union with the surface layer of the metal.

The process may involve three steps:

(*a*) Treating the surface of a metal article with a substance or substances having the properties of a flux, a cleansing agent and a gas eliminator, freeing the surface of the metal from gaseous bubbles incidentally formed during other steps of the process, which bubbles would ordinarily prevent complete union of the rubber with the metal.

(*b*) Applying a layer of vulcanizable rubber (soft or hard) to the treated surface of the metal, and (*c*) Subjecting the metal and applied rubber to vulcanizing temperature until the rubber is vulcanized.

In the course of experimentation I have found that alloys of the royal metals and of copper adapt themselves particularly to this process, although the same can doubtless be employed for uniting rubber to iron or other metals with good results. I use powdered charcoal as a gas eliminator and find that it prevents the formation of gaseous bubbles on the metallic surface both by absorbing the gas and by mechanically furnishing an avenue of escape for said gas bubbles. Sodium chloride, in crystalline form is employed as a flux, and functions well as a cleansing agent for the surface of the metal.

In carrying out the process, the surface of the metal is carefully cleansed mechanically. A paint is then applied to this surface in a thin coating, said paint consisting of the powdered charcoal and sodium chloride, carried in a vehicle of pure rubber, or rubber to which a small quantity of guttapercha has been added, dissolved in a suitable solvent such as benzol or chloroform, sulphur also being added in the minimum amount necesary to effect proper vulcanization of the vehicle into soft or hard rubber. A layer of soft or hard vulcanizable rubber is then pressed upon the painted surface of the metal, and the whole subjected to vulcanization.

Bubbles of sulphuretted hydrogen or other gases which would form on the surface of the metal are either absorbed by the charcoal or assisted by it mechanically to escape, while the sodium chloride acts as a flux for the rubber, increasing the re-action velocity and maintaining a purifying action upon the surface of the metal, probably by the formation of volatile chlorides.

In the resulting product, the paint seems to have become a homogeneous part of the rubber, and the latter to have become integral in its adherence to the metal in the original plane of separation between the metal and rubber, so that attempts to tear, chip or peel the rubber away from the metal result in the rubber disintegrating more readily in other portions of its mass than in said original planes of separation.

It is to be understood that numerous equivalent agents may be used in the practice of the above described process without departing from the spirit of the invention.

Having described my invention what I claim as new and desire to secure by Letters Patent, is:—

1. The process of uniting rubber to metal which comprises applying to the surface of the metal a gas eliminating agent, placing vulcanizable rubber against the surface to which said agent has been applied, and subjecting the whole to vulcanizing temperature until the rubber is vulcanized.

2. The process of uniting rubber to metal which consists in applying to the surface of the metal a gas eliminating agent, and a flux, placing vulcanizable rubber against the surface to which said agent has been applied, and subjecting the whole to vulcanizing temperature until the rubber is vulcanized.

3. The process of uniting rubber to metal which comprises treating the surface of the metal with powdered charcoal, placing vulcanizable rubber against said treated surface, and subjecting the whole to vulcanizing temperature until the rubber is vulcanized.

4. The process of uniting rubber and metal which comprises treating the surface of the metal with a paint containing substances having the equivalent functions of raw rubber, sulphur, and charcoal, placing vulcanized rubber against the surface so treated, and subjecting the whole to vulcanizing temperature until the rubber is vulcanized.

5. The process of uniting rubber and metal which consists in treating the surface of the metal with a paint containing substances having the equivalent functions of raw rubber, sulphur, charcoal, and sodium chloride, placing vulcanizable rubber against the surface so treated, and subjecting the whole to vulcanizing temperature until the rubber is vulcanized.

In testimony whereof I have hereunto set my hand.

ROBERT MORSE WITHYCOMBE.